United States Patent [19]

Drumright et al.

[11] Patent Number: 5,644,017

[45] Date of Patent: Jul. 1, 1997

[54] POLYCARBONATE TERMINATED BY AN IONIC SULFONATED AROMATIC MOIETY AND PREPARATION THEREOF

[75] Inventors: Ray E. Drumright; Michael J. Mullins; Stephen E. Bales, all of Midland, Mich.

[73] Assignee: The Dow Chemical Company, Midland, Mich.

[21] Appl. No.: 519,853

[22] Filed: Aug. 25, 1995

[51] Int. Cl.$^6$ .................................................. C08G 63/02
[52] U.S. Cl. ........................ 528/196; 528/199; 528/373
[58] Field of Search ............................... 528/196, 199, 528/373

[56] References Cited

U.S. PATENT DOCUMENTS

| | | | |
|---|---|---|---|
| 3,959,561 | 5/1976 | Walles | 428/412 |
| 4,195,156 | 3/1980 | Bruckdorfer | 528/171 |
| 4,316,838 | 2/1982 | Tokuda | 260/45.95 |
| 4,403,087 | 9/1983 | Mark | 528/196 |
| 4,469,860 | 9/1984 | Rosenquist | 528/196 |
| 5,097,002 | 3/1992 | Sakashita et al. | 528/199 |
| 5,097,005 | 3/1992 | Tietz | 528/272 |
| 5,227,456 | 7/1993 | Shepherd et al. | 528/173 |

FOREIGN PATENT DOCUMENTS

| | | |
|---|---|---|
| 0213466 | 3/1987 | European Pat. Off. . |
| 7228676 | 8/1995 | Japan .............................. C08G 63/64 |

OTHER PUBLICATIONS

Degree et al., *Synthesis and Characterization of Halato–Telechelic Bisphenol–A Polycarbonates*, Polymer, vol. 35, No. 2, pp. 371–376 (1994).

*Primary Examiner*—Terressa Mosley

[57] ABSTRACT

An aromatic polycarbonate is terminated by an ionic sulfonated aromatic moiety bonded to the polycarbonate by a carbonate or ester linkage. The aromatic polycarbonate can be terminated by reacting a sulfonated aromatic compound such as a sulfonated phenol, sulfonated benzoic acid, phenyl ester of a sulfonated aromatic carboxylic acid and sulfonated diphenyl carbonate with an aromatic polycarbonate, an aromatic dihydroxy compound and a carbonate precursor, or a combination thereof. The reaction can be performed in a nonaqueous solution or a melt transesterification process. The aromatic sulfonated terminated polycarbonate can be thermally molded and displays non-newtonian melt rheology and improved solvent resistance.

21 Claims, No Drawings

POLYCARBONATE TERMINATED BY AN IONIC SULFONATED AROMATIC MOIETY AND PREPARATION THEREOF

FIELD OF THE INVENTION

The present invention relates to an improved polycarbonate which displays excellent flame resistance, non-newtonian rheology and improved solvent resistance.

BACKGROUND OF THE INVENTION

A typical linear aromatic polycarbonate displays nearly newtonian melt rheology, unexceptional flame resistance compared to branched polycarbonate and poor solvent resistance (i.e., complete miscibility in methylene chloride). Non-newtonian melt rheology of polycarbonates, which is advantageous for forming articles by blow molding and profile extrusion, typically has been achieved by branching the aromatic polycarbonate. Polycarbonate having improved flame resistance has typically been made using brominated monomers or by additions of known flame retardants such as antimony oxide, inorganic and organic salts of alkali and alkali earth metals. These modified polycarbonates often exhibit reduced thermal stability and increased corrosivity which leads to poor color and black specks during molding.

Polycarbonate made by a method purporting to terminate a polycarbonate with sulfonated aromatic end-caps has been described. The described polycarbonate displayed a slight non-newtonian melt rheology (U.S. Pat. No. 4,469,860). In the polycarbonate preparation method of the '860 patent, a basic aqueous interfacial polymerization process employing a sulfonated phenol or napthol terminating agent such as 4-hydroxybenzenesulfonic acid is used.

Using the process described by the '860 patent, Degee et al., *Polymer*, 35, (2), pp. 371–376, attempted to form a sulfonated aromatic endcapped polycarbonate by an aqueous interfacial polymerization process using 4-hydroxybenzenesulfonic acid. Degee et al. determined that no termination resulted in the process which was explained as being due to the instability of the sulfonated carbonate endcap in the presence of aqueous base resulting in a polycarbonate product which is terminated by a phenoxide moiety and not a sulfonic acid or sulfonate salt moiety.

Therefore, it would be desirable to provide a linear aromatic polycarbonate having improved flame resistance, improved solvent resistance and significant non-newtonian melt rheology and a process to form said aromatic polycarbonate.

SUMMARY OF THE INVENTION

A first aspect of this invention is a polycarbonate comprising a thermoplastic aromatic polycarbonate which has a plurality of terminating groups wherein at least 10 mole percent of said terminating groups are an aromatic sulfonated terminating (ASTer) group having the structure:

Ester bonded ASTer group

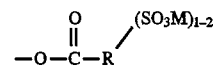

Carbonate bonded ASTer group

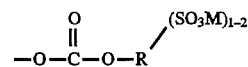

wherein R is an aromatic group, M is selected from the group consisting of hydrogen, a quaternary nitrogen group, a quaternary phosphorous group, an alkali metal, zinc, tin, aluminum and an alkaline earth metal. The ASTer group is an aromatic group having an ionic sulfonate moiety which is bonded to the polycarbonate chain through a carbonate or ester linkage, as illustrated above. "Polycarbonate" is used herein to mean a thermoplastic polymer comprised of a plurality of linear or branched chains having carbonate linkages where each chain has at least two terminal groups. A thermoplastic aromatic polycarbonate; in which at least 10 mole percent of the termination groups are ASTer groups will be hereinafter referred to as a sulfonated terminated polycarbonate. An ASTer group which is bonded to the polycarbonate chain through an ester will be referred to as an ester bonded ASTer group hereinafter and is illustrated by the above structure (a). An ASTer group which is bonded to the polycarbonate chain through a carbonate will be referred to as a carbonate bonded ASTer group hereinafter and is illustrated by the above structure (b).

The polycarbonate of the first aspect of this invention typically will display greater non-newtonian melt rheology, improved flame resistance and improved solvent resistance compared to a similar polycarbonate which does not contain said aromatic sulfonated terminating (ASTer) groups.

A second aspect of this invention is a process to make an aromatic polycarbonate having improved flame resistance and non-newtonian melt rheology, the process comprising reacting (A), a sulfonated aromatic terminating compound having a structure:

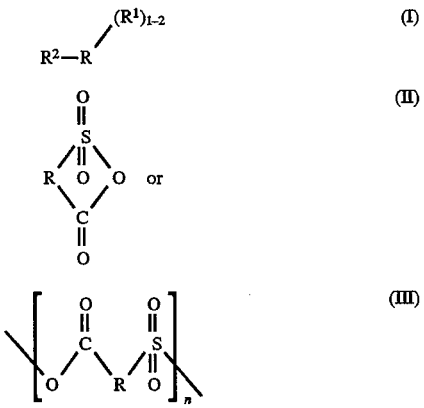

wherein

R is an aromatic group, $R^1$ is —$S(O)_2J$ in which J is a halogen or —$OM_s$, where $M_s$ is hydrogen, a quaternary phosphorous group, or a quaternary nitrogen group, $R^2$ is (1) HO— provided that J is —$OM_s$, (2) XC(O)O— in which X is a halogen and provided that J is —$OM_s$, (3) HO(O)C— provided that J is a halogen, or (4) X(O)C— in which X is a halogen, with (B), (i) an aromatic polycarbonate, (ii) an aromatic dihydroxy compound and a carbonate precursor, or (iii) a combination thereof, in the presence of an organo amino base and a nonaqueous solvent at conditions sufficient to form an aromatic polycarbonate having an aromatic sulfonated terminating (ASTer) group. The above structure (II) will be referred to as a cyclic mixed anhydride herein. The above structure (III) will be referred to as a polymeric mixed anhydride herein. Both the cyclic and polymeric anhydride are a mixed anhydride of carboxylic acid and sulfonic acid.

A third aspect of this invention is a process to make an aromatic polycarbonate having improved solvent resistance and non-newtonian melt rheology, the process comprising reacting (A), a sulfonated aromatic terminating compound having the structure:

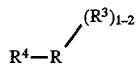

wherein R is an aromatic group,

R³ is —SO₃M in which M is hydrogen, a quaternary nitrogen group, a quaternary phosphorous group, an alkali metal, zinc, tin, aluminum or an alkaline earth metal, and R⁴ is (a) HO—,
(b) R⁵O(O)C— in which R⁵ is hydrogen, an alkyl group or an aromatic group, or
(c) R⁶O(O)CO— in which R⁶ is an alkyl group or an aromatic group, with (B), (i) an aromatic polycarbonate,
(ii) an aromatic dihydroxy compound and a carbonate precursor, or
(iii) a combination thereof, at a temperature above the melting temperature of the aromatic polycarbonate, aromatic dihydroxy compound or carbonate precursor and at conditions sufficient to form an aromatic polycarbonate having an aromatic sulfonated terminating (ASTer) group.

DETAILED DESCRIPTION OF THE INVENTION

The polycarbonate chains of the sulfonated terminated polycarbonate may be any linear or branched aromatic polycarbonate chain. Preferably the chain is a linear aromatic polycarbonate, and most preferably a linear aromatic polycarbonate which is a product of bisphenol A and a carbonate precursor such as a disubstituted carbonic acid derivative (e.g., phosgene), a haloformate (e.g., a bishaloformate of glycol or dihydroxy benzene) or a carbonate ester.

The ASTer group has a R group which is an aromatic group, the aromatic group being an aryl, heteroaromatic, monocyclic or bicyclic aromatic group. Preferably the R group is an aryl group, and more preferably phenylene. The ASTer group has a cation (M) as described hereinabove. Preferably M is an alkali metal or alkaline earth metal, more preferably M is sodium.

The mole percent of terminating groups that are ASTer groups is preferably at least about 10, more preferably at least about 20 and most preferably at least about 50 mole percent. The ASTer group bonded to the polycarbonate chains of a polycarbonate polymer may be entirely comprised of a carbonate bonded ASTer group, ester bonded ASTer group or a mixture thereof. The quantity ASTer groups terminating the sulfonated terminated polycarbonate can be determined from the proton and carbon NMR described herein. The peaks present in the NMR spectra identify whether the polycarbonate is terminated by an ASTer group or some other group. Since the area under an absorption band (peak) is proportional to the number of nuclei responsible for the absorption, the mole percent of ASTer groups can be determined from the area of the ASTer group peak(s) relative to the area of other terminating group peak(s) present in the polymer. NMR methods and quantitative analysis techniques (i.e., integration) are described in more detail in *Instrumental Methods of Analysis 6th Ed.*, Willard, H. H. et al, Wadsworth Pub. Co., Belmont, Calif., 1981, p. 317–356, incorporated herein by reference.

Preferably the sulfonated terminated polycarbonate displays greater non-newtonian melt rheology (i.e., decreasing viscosity with increasing shear at a given melt temperature) compared to a similar polycarbonate which does not contain said aromatic sulfonated terminating (ASTer) groups.

In a chlorinated solvent such as methylene chloride, the thermally moldable linear sulfonated ionic aromatic polycarbonate of this invention having an ASTer group wherein M is a metal such as sodium may have a desirable reduced solubility compared to a linear aromatic polycarbonate of similar molecular weight without said terminating groups. For example, the solubility of a methylene chloride miscible linear aromatic polycarbonate may be advantageously made slightly miscible to essentially immiscible by terminating a portion of said polycarbonate by a metal sulfonate salt ASTer group. The level of solubility depends on and is proportional to the quantity of metal salt sulfonated ASTer groups terminating the chains of the polycarbonate. The solubility can range from completely miscible to essentially immiscible in methylene chloride after 24 hours at about 20° C. and a polycarbonate solute concentration of about 1 to about 50 volume percent. Preferably less than about 67, more preferably less than about 33, and most preferably essentially 0 volume percent of the moldable polycarbonate is dissolved in methylene chloride after 24 hours at a polycarbonate solute concentration of about 10 to 30 volume percent and temperature of about 20° C.

The sulfonated terminated polycarbonate can be formed in a melt process or a nonaqueous solution process. To form a sulfonated terminated polycarbonate of this invention, an ASTer compound is reacted with an aromatic polycarbonate and/or an aromatic polycarbonate precursor mixture. An aromatic sulfonated terminating (ASTer) compound is a compound which can react with a polycarbonate polymer chain terminating group resulting in the polycarbonate chain being terminated by an ASTer group previously described. The aromatic polycarbonate precursor mixture is comprised of an aromatic dihydroxy compound and a carbonate precursor as described below. If a randomly branched carbonate polymer is desired, the mixture may contain a small amount of a trihydric and/or tetrahydric phenol compound, as illustrated by the trihydric and/or tetrahydric phenols described in U.S. Pat. No. 3,544,514. When the precursor mixture is a reactant, said processes cause the polymerization of the precursor mixture dihydroxy compound and carbonate precursor forming a polycarbonate which is subsequently terminated with an ASTer group, hence forming the sulfonated terminated polycarbonate. When the aromatic polycarbonate is a reactant, said processes cause said polycarbonate to be terminated by an ASTer group, again forming the sulfonated terminated carbonate.

In the solution process, the above described reactants are reacted in a nonaqueous solvent such as a chlorinated hydrocarbon (e.g., methylene chloride, 1,2-dichloroethane, tetrachloroethane, chlorobenzene and chloroform) in the presence of an organo amino base such as pyridine, tributylamine and triethylamine in a manner similar to that described in U.S. Pat. No. 3,169,121, incorporated herein by reference.

An ASTer compound in which R² is HO(O)C— or X(O)C— reacts in the solution process to form a sulfonated terminated polycarbonate terminated by an ester ASTer group. As described hereinbefore, when $R^2$ is HO(O)C—, J must be a halogen. Examples of the above ASTer compound may include 4-sulfobenzoyl chloride, 3 sulfobenzoyl chloride, 2 sulfobenzoyl chloride, 3,5-disulfobenzoyl chloride as described by German Patent DE 1,170,939, incorporated herein by reference. Examples may also include 3-chlorosulfonyl benzoic acid, 4-chlorosulfonylbenzoic acid, 2-sulfobenzoic acid cyclic anhydride and polymeric anhydrides of 3- and 4-sulfobenzoic acid as described by *Helvetica Chem. Acta*, Vol. 24, pp. 197–212, 1941, incorporated herein by reference. In addition, examples may include the cyclic mixed anhydride or polymeric mixed anhydrides. An example of a suitable cyclic anhydride is 2-sulfobenzoic acid cyclic anhydride. Examples of a suitable polymeric mixed anhydride include those described by Ruggli, *Helv. Chim Acta*, 1941, 24 197–212, incorporated herein by reference and illustrated by the self condensation of 3-chlorosulfonylbenzoic acid as shown by the below structure:

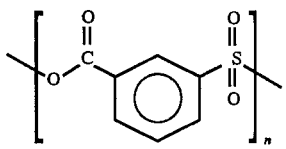

An ASTer compound in which $R^2$ is HO— or XC(O)O— reacts in the solution process to form a sulfonated terminated polycarbonate terminated by a carbonate bonded ASTer group. As described hereinbefore, when $R^2$ is HO— or XC(O)O—, J must be —OM$_s$. Examples of the above compound include sulfonated phenols which are known and may be prepared by sulfonation chemistry described by *Sulfonation and Related Reactions*, E. E. Gilbert, Interscience Publishers, Wiley and Sons, 1965, incorporated herein by reference. Examples of a suitable sulfonated phenol which may be reacted include m-hydroxybenzenesulfonic acid, p-hydroxybenzenesulfonic acid, 5-hydroxy-2-methylbenzene sulfonic acid, 1-naphthol-3-sulfonic acid, 1-naphthol-4-sulfonic acid, 1-naphthol-3,6-disulfonic acid, 1-naphthol-3,8-disulfonic acid, 1-naphthol-4,8-disulfonic acid, 2-naphthol-6,8-disulfonic acid, 1-naphthol-4-sulfonic acid, 8-hydroxyquinoline-5-sulfonic acid, 3,5-dichloro-4-hydroxybenzenesulfonic acid, 2-hydroxy-4-methoxy-5-sulfobenzophenone, guaiacol sulfonic acid (4-hydroxy-3-methoxybenzenesulfonic acid) and 2,4-disulfophenol. The sulfonate salts of the above sulfonic acid ASTer compound may be used when the cation of the salt is not a metal; the cation being, for example, tetrabutylammonium, tetraethylammonium and tetramethylammonium. A chloroformate such as 4-sulfophenyl chloroformate, as prepared by the method described in U.S. Pat. No. 4,985,561, incorporated herein by reference, may be used in place of a phenol.

Preferably R is phenylene in the above ASTer compounds. Also, it is preferred that the ASTer compound is essentially miscible in the solvent.

As stated previously, the aromatic polycarbonate precursor mixture is comprised of an amount of at least one aromatic dihydroxy compound and at least one carbonate precursor. The dihydroxy compound can be any dihydroxy compound having a structure:

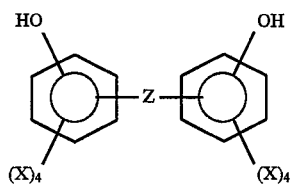

wherein:

(I) Z is (A) a divalent radical, of which all or different portions can be aliphatic or aromatic, said divalent radical being composed of 1–35 carbon atoms together with up to five oxygen, nitrogen, sulfur, phosphorous and/or halogen (such as fluorine, chlorine and/or bromine) atoms; or (B) S, S$_2$, SO, SO$_2$, O or CO; or ( C) a single bond; and (II) each X is independently hydrogen, a halogen (such as fluorine, chlorine and/or bromine), a $C_1$–$C_{12}$ linear or cyclic alkyl, alkoxy, aryl or aryloxy radical, such as methyl, ethyl, isopropyl, cyclopentyl, cyclohexyl, methoxy, ethoxy, benzyl, tolyl, xylyl, phenoxy and/or xylynoxy.

For example, the bridging radical represented by Z in the above formula can be a carbon atom to which is bonded one or more groups such as H, CH$_3$, C$_2$H$_5$, C$_3$H$_7$, n—C$_3$H$_7$, i—C$_3$7, cyclohexyl, bicyclo[2.2.1]heptyl, benzyl, CF$_2$, CF$_3$ CCl$_3$, CF$_2$Cl, CN, (CH$_2$)$_2$COOCH$_3$ or PO(OCH$_3$)$_2$. The dihydroxy compound may also be a compound such as 9,9-bis(4-hydroxyphenol)fluorene.

A carbonate precursor such as a disubstituted carbonic acid derivative (e.g., phosgene and an aromatic diester of a carbonic acid described below), a haloformate (e.g., a bishaloformate of glycol or dihydroxy benzene) and a carbonate ester may be used in the solution process of this invention. An aromatic diester of a carbonic acid which may be used to make the sulfonated terminated polycarbonate include aromatic diesters of a carbonic acid represented by the structure:

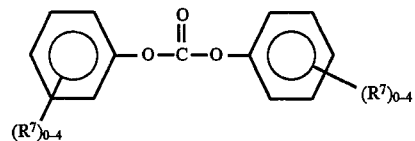

wherein each $R^7$ is independently alkyl, alkoxy, aryl, aryloxy or NO$_2$. Preparation of such a diester is described in U.S. Pat. No. 4,182,726, incorporated herein by reference.

When an aromatic polycarbonate is a reactant in the solution process, the aromatic polycarbonate can be any aromatic polycarbonate derived from the previously described dihydroxy compounds and carbonate precursors provided that at least some portion of the polycarbonate chains are terminated by a group containing a reactive moiety, such as a hydroxyl, which can react with the ASTer compound to form an ester or carbonate linkage to the polycarbonate chain. An example of a suitable terminating group is a hydroxyl moiety substituted on a terminal benzene ring, herein referred to as a phenol group. The aromatic polycarbonate can be made by any process such as a phase boundary process in which the dihydroxy compound is dissolved and deprotonated in an aqueous alkaline solution and the carbonate precursor is dissolved in an aqueous immiscible organic solvent and subsequently reacted, a melt process, a nonaqueous solution process and/or polymerization of cyclic oligomers. The methods for preparing aromatic polycarbonate are discussed in greater detail in Schnell, U.S. Pat. No. 3,028,365; Glass, U.S. Pat. No. 4,529,791 and Grigo, U.S. Pat. No. 4,677,162, each incorporated herein by reference.

The solution process is performed for a time sufficient to form the sulfonated terminated polycarbonate. Preferably the reaction time is about 0.5 to about 48 hours at a temperature above the solution's freezing point and below the solution's boiling temperature, more preferably the reaction temperature is from about −25° C. to 75° C., and most preferably from about 0° C. to 45° C. An amount of sulfonated aromatic terminating compound which is sufficient to react and form a sulfonated terminated polycarbonate having any percent greater than 1 mole percent of the terminating groups being ASTer groups is added to the solution. Preferably an amount of sulfonated terminating compound which is sufficient to react and form a sulfonated terminated polycarbonate having at least about 10, more preferably at least about 20, and most preferably at least about 50 mole percent of the terminating groups being ASTer groups is added to the solution. An amount of sulfonated terminating compound which is in excess of that needed to form a sulfonated terminated polycarbonate completely terminated by ASTer groups may be added if so desired. However, great excess of ASTer compound is not necessary to form the sulfonated terminated polycarbonate. Excess ASTer compound may inhibit the attainment of high molecular weight polycarbonate. The concentration of the reactants in the solution are preferably below the saturation point for any of the individual reactants and/or products. Since the reaction is a solution reaction, any convenient pressure or atmosphere may be used, preferably the gaseous environment above the solution is inert and substantially absent of water.

Because the above reaction is performed in the presence of an organo amino base, the sulfonated terminated polycarbonate contains ASTer groups which have an ionic sulfonate salt moiety, wherein the salt's cation (M) is an organo ammonium cation such as a pyridinium or trimethylammonium. This sulfonated terminated polycarbonate can be purified by washing with a washing solvent which is immiscible with the solvent used to react the reactants and subsequently removing the washing solvent containing by-products, impurities, and/or unreacted reactants. An example of a washing solvent which may be used is acidified water such as 3N HCl which may be followed by a lower concentration acid. The sulfonated terminated polycarbonate in solution may be precipitated by adding or being added to a liquid which is a poor solvent for the polymer such as heptane, acetone, isopropanol, methanol and combinations thereof. The precipitated sulfonated terminated polycarbonate can be separated from the solvent by a separation technique such as settling, filtration and distillation. Before precipitating, some of the solvent may be removed by, for example, evaporation. Further removal of by-products and solvent from the sulfonated terminated polycarbonate may be accomplished by techniques such as washing, filtrating, distilling and drying.

A solution of the above sulfonated terminated polycarbonate terminated by organo amino sulfonate salt ASTer groups may be passed through a bed of a strong acid cation exchange resin in order to replace the organo amino cation with a hydrogen cation (i.e., forming a sulfonic acid moiety). Examples of suitable solvents to dissolve said polycarbonate are a chlorinated hydrocarbon (e.g., methylene chloride, 1,2-dichloroethane, tetrachloroethane, chlorobenzene and chloroform), tetrahydrofuran, dioxane, nitrobenzene, dimethyl sulfoxide, xylene, cresol, anisole or combination thereof. The resulting sulfonate terminated polycarbonate terminated by sulfonic acid ASTer groups can be purified and separated as previously described above.

Further the sulfonated terminated polycarbonate terminated by sulfonic acid ASTer groups may be dissolved in a solvent such as a chlorinated hydrocarbon (e.g., methylene chloride, 1,2-dichloroethane, tetrachloroethane, chlorobenzene and chloroform), tetrahydrofuran, dioxane, nitrobenzene, dimethyl sulfoxide, xylene, cresol, anisole, trifluoracetic acid or combination thereof and the cation (M) exchanged by any convenient reaction method such as ion exchange or reaction with a metal acetate. Because the metal salt form of the polycarbonate may have reduced solubility in a non-coordinating solvent such as methylene chloride, it is desirable to exchange the cation in a solvent which has at least a portion of said solvent being a coordinating solvent such as tetrahydrofuran or trifluoracetic acid. The above sulfonated terminated polycarbonate may be reacted in solution with a sodium acetate at any temperature where the reaction solution is a liquid, but is preferably performed at room temperature. The reaction is carried out for a time sufficient to essentially react the sulfonic acid of the ASTer group to a metal sulfonate salt. The concentration of the reactants in the solution are preferably below the saturation point for any of the individual reactants and/or products. Since the reaction is a solution reaction, any convenient pressure or atmosphere may be used. Preferably the gaseous environment is inert and substantially absent of water. Again, this sulfonated terminated polycarbonate can be purified and collected as described previously.

In the melt process for preparing a sulfonated terminated polycarbonate, a melt having an ASTer compound and any aromatic polycarbonate and/or aromatic polycarbonate precursor mixture comprised of an aromatic dihydroxy compound and a carbonate precursor previously described, is reacted at a pressure and conditions sufficient to form a sulfonated terminated polycarbonate. Preferably the pressure is subatmospheric. Preferably the ASTer compound is soluble in the aromatic polycarbonate and/or aromatic polycarbonate precursor mixture at some point during the melt process. The aromatic dihydroxy and carbonate precursor can be any of the previously described compounds, except for an aromatic diester of a carbonic acid containing a reactive halogen species such as phosgene. Phosgene, for example, is not a practical carbonate precursor in the melt process of this invention because of the formation of HCl and the difficulty of removing said HCl from the reaction. Preferably the aromatic dihydroxy compound and carbonate precursor are bisphenol A and diphenyl carbonate. The aromatic polycarbonate can be any of the previously described polycarbonates with or without terminating groups which have a reactive site, preferably the polycarbonate is a polycarbonate which is a product of bisphenol A and a carbonate precursor.

An ASTer compound in which $R^4$ is $R^5O(O)C$— reacts in the melt process to form a sulfonated terminated polycarbonate terminated by an ester bonded ASTer group. For the same reason, phosgene is not practical in the melt process; an ASTer compound containing a reactive halogen species is also not practical to form the sulfonated terminated polycarbonate of this invention in a melt transesterification process. When $R^5$ is a sulfonated aromatic group a mixture of ester and carbonate bonded ASTer groups may result.

Examples of compounds suitable for reacting in the melt to form an ester bonded ASTer group include 2-sulfobenzoic acid, 3-sulfobenzoic acid, 4-sulfobenzoic acid, 3,5- disulfobenzoic acid, phenyl 2-sulfobenzoate, phenyl 3-sulfobenzoate, phenyl 4-sulfobenzoate, 2-bromo-5-sulfobenzoic acid, 2-hexadecyloxy-5-sulfobenzoic acid, 2-hexadecylthio-5-sulfobenzoic acid and 4-[4-sulfophenoxy-(4-phenoxy)]-benzoic acid. Preferably the ASTer compound is a phenyl ester of a sulfonated aromatic carboxylic acid.

An ASTer compound in which $R^4$ is HO— or $R^6O(O)CO$— reacts in the melt process to form a sulfonated terminated polycarbonate terminated by a carbonate bonded ASTer group. Examples of compounds suitable for reacting in the melt process to form a carbonate bonded ASTer group include sulfophenyl phenyl carbonate, m-hydroxybenzenesulfonic acid, p-hydroxybenzenesulfonic acid, 5-hydroxy-2-methylbenzene sulfonic acid, 1-naphthol-3-sulfonic acid, 1-naphthol-4-sulfonic acid, 1-naphthol-3,6-disulfonic acid, 1-naphthol-3,8-disulfonic acid, 1-naphthol-4,8-disulfonic acid, 2-naphthol-6,8-disulfonic acid, 1-naphthol-4-sulfonic acid, 8-hydroxyquinoline-5-sulfonic acid, 2-hydroxy-4-methoxy-5-sulfobenzophenone, guaiacol sulfonic acid (4-hydroxy-3-methoxybenzenesulfonic acid) and 2,4-disulfophenol. The sulfonated salts of the above sulfonic acid compounds may also be used. Preferably the ASTer compound is a sulfonated diphenylcarbonate.

A basic catalyst such as lithium hydroxide, sodium hydroxide, sodium methylate, sodium bisphenolate, calcium acetate, phenyl benzoate, N-stearylphenothiazine, quaternary ammonium chloride, an alkaline(hydroxy)fluoroborate, an alkali metal salt of benzoic acid, an iminocarboxylic acid or basic metal oxides such as zinc, lead, antimony, tin oxide or combination thereof may be added to the melt reaction. If a basic catalyst is added, the catalyst added is preferably lithium hydroxide.

An amount of sulfonated aromatic terminating compound which is sufficient to react and form a sulfonated terminated polycarbonate having any percent greater than 1 mole percent of the terminating groups being ASTer groups is added to the reactant mixture. Preferably an amount of sulfonated terminating compound which is sufficient to react and form a sulfonated terminated polycarbonate having at least about 10, more preferably at least about 20, and most preferably at least about 50 mole percent of the terminating groups being ASTer groups is added to the reactant mixture. An amount of sulfonated terminating compound which is in excess of that needed to form a sulfonated terminated polycarbonate completely terminated by ASTer groups may be added if so desired. However, great excess of ASTer compound is not necessary to form the sulfonated terminated polycarbonate. Excess ASTer compound may inhibit the attainment of high molecular weight polycarbonate.

Typically, the melt reaction of this invention is carried out by heating to about 100° C. to about 350° C. and sequentially reducing the pressure from atmospheric pressure (about 760 millimeters of mercury), wherein the reduced pressure removes by evaporation an alcohol such as phenol, furthering the reaction. Preferably the maximum reaction temperature is about 150° C. to about 300° C. Most preferably the maximum reaction temperature is about 175° C. to about 300° C. The pressure at the highest reaction temperature can be run at a pressure ranging from about 0.001 to about 100 millimeters of mercury. The pressure at the maximum reaction temperature is preferably at most 10 millimeters of mercury and, most preferably at most 1 millimeter of mercury. The gaseous atmosphere over the reaction is preferably an inert gas such as nitrogen and argon.

The sulfonated terminated polycarbonate from the melt process can have by-products, impurities and/or unreacted reactants removed by methods previously described herein. In addition, the melt process formed sulfonated terminated polycarbonate can undergo the same process of ion exchange and metal acetate reaction described previously for the solution process.

A most preferred embodiment of this invention is a sulfonated terminated polycarbonate having polycarbonate chains which are solely a product of bisphenol A and a carbonate precursor with said chains being essentially completely terminated by either an ester or carbonate bonded ASTer group, wherein M is sodium and R is a phenylene.

Since the sulfonated terminated polycarbonates of this invention are thermoplastic they can be formed by any convenient thermal process such as extrusion, injection molding and blow molding. The sulfonated terminated polycarbonates of this invention can advantageously be used in applications requiring solvent resistance and thermal processing methods. The sulfonated aromatic carbonates of this invention can be used in an engineering thermoplastic application such as automotive exterior molding, glaze, clear medical container or tubing, appliance interior or exterior element and computer housing.

Test Methods

The test methods used in the following examples are as follows.

The polycarbonate inherent viscosity as described in *Preparative Methods of Polymer Chemistry*, W. R. Sorenson and T. W. Campbell, 1961, p.35, is determined at 25° C. in 65 weight percent methylene chloride, $(CH_2Cl_2)/35$ weight percent trifluoroacetic acid $CF_3CO_2H$ solution and/or tetrahydrofuran at a polycarbonate concentration of 0.5 gram/deciliter.

Polymer transition temperatures are obtained by using a Dupont DSC 2910 Differential Scanning Calorimeter (DSC). Samples are heated in air at 20° C./min to 300° C. The melt is cooled and rerun under the same conditions as above and the glass transition temperature (Tg) is determined by the inflection point of the baseline shift from the second run.

Proton and carbon nuclear magnetic resonance spectra of the sulfonated terminating groups and polycarbonates are obtained using a Varian VXR-300 NMR in either dimethyl sulfoxide (DMSO-$d_6$) or 65 weight percent $CDCl_3/35$ weight percent $CF_3CO_2D$ solution using a tetramethylsilane reference.

Analytical liquid chromatography is performed on a Hewlett-Packard Model 1090 Liquid Chromatograph using an Alltech Adsorbosphere™ HS-C18 column. The elution solvents are tetrahydrofuran and 0.05 molar triethylammonium acetate ($ET_3NHOAC$) in water prepared using HPLC grade triethylamine.

$M_n$ and $M_w$ are determined by GPC employing a Hewlett-Packard HP 1090 Liquid Chromatograph equipped with a PL gel mixed D column using tetrahydrofuran containing 0.1 volume tributylamine as the elution solvent and a broad polycarbonate standard for calibration.

Melt rheology of polycarbonate examples and comparative examples are performed by capillary rheometry using an Instron 3211 capillary rheometer having a capillary length of 1.0048 inches and a diameter of 0.0302 inch at a temperature of 300° and 333° C. by the method described in ASTM D 1703.

Complex melt viscosity is determined using a parallel plate Rheometrics IIE viscometer using a 25 millimeter diameter parallel plate fixture. The complex viscosity is determined on the polymers at a temperature about 50° C. greater than $T_g$ and at a constant as possible torque in a nitrogen atmosphere.

Below are specific examples within the scope of the invention and comparative examples. The specific examples are for illustrative purposes only and in no way limit the invention described herein.

EXAMPLES

EXAMPLE 1

Preparation of a 4-Sulfophenyl Carbonate Terminated Polycarbonate by a Solution Process Example 1A: Preparation of a Polycarbonate Having Terminating Groups Containing a Phenol Group A polycarbonate having terminal phenol groups is prepared by condensation of bisphenol A with phosgene in methylene chloride with pyridine as a base as described by U.S. Pat. No. 3,028,365. The inherent viscosity of the polymer in methylene chloride is 0.290 dL/g, and in tetrahydrofuran (THF) it is 0.313 dL/g (25.0° C., 0.5 g/dL). The $T_g$ of the polymer is 144° C. The number average degree of polymerization is 28.7 as determined by proton NMR.

Example 1B: Preparation of a 4-Chlorocarbonyl-oxybenzenesulfonic Acid

4-Chlorocarbonyloxybenzenesulfonic acid is prepared by a method described in U.S. Pat. No. 4,985,561 and is as follows. A 250 mL flask equipped with condenser, addition funnel, magnetic stirrer and gas inlet is dried with a heat gun as nitrogen flows through the system. The flask is charged with 70 mL of 1M $SO_3$ in $CH_2Cl_2$ and cooled in an ice bath. About 11 grams of a phenylchloroformate, which is known in the art and commonly available, is added to the flask dropwise with an addition funnel. As the addition proceeds a white solid precipitates from the reaction mixture. After the addition is complete, the reaction is stirred for an additional hour in the ice bath. The ice bath is then removed and the reaction allowed to stir at ambient temperature overnight. The white solid is then quickly collected by vacuum filtration, washed once with $CH_2Cl_2$ and dried under vacuum. About 14.8 g of 4-chlorocarbonyloxybenzenesulfonic acid is formed as determined by $^1H$ and $^{13}C$ NMR in DMSO-$d_6$.

Example 1C: Preparation of a 4-Sulfophenyl Carbonate Terminated Polymer

The 4-sulfophenyl carbonate capped polymer is prepared as follows. A 1L, 4 neck flask equipped with condenser, stirrer, addition funnel and nitrogen inlet is filled with 50 g of the polycarbonate of Example 1A, 14.8 g of p-chlorocarbonyloxybenzenesulfonic acid of Example 1B and 500 mL of methylene chloride. The reaction mixture is cooled in an ice bath and then 12.65 g of triethylamine is added drop-wise through the addition funnel. After stirring for two hours, the ice bath is removed and the reaction mixture stirred at ambient temperature for 24 hours. The reaction mixture is then washed with 100 mL of 3N HCl followed by 100 mL of 1N HCl. A small aliquot of the polymer solution is precipitated into methanol resulting in isolation of a polycarbonate terminated by a triethylammonium salt of 4-sulfophenyl carbonate. Next 50 mL of THF is added to the methylene chloride solution containing the polymer terminated by the triethyl ammonium salt of 4-sulfophenyl carbonate and the solution is passed down an ion exchange column containing strong acid cation exchange resin. The ion exchange column is prepared by washing 100 mL of the exchange resin with 500 mL of water, 1200 mL of THF, 400 mL of $CH_2Cl_2$ and finally 300 mL of 90 volume percent $CH_2Cl_2$/10 volume percent THF (v/v). After eluting the polymer solution, the beads are rinsed with 100 mL of 90 volume percent $CH_2Cl_2$/10 volume percent THF. The eluent is then concentrated to 250 mL by rotary evaporation and precipitated into 2 L of methanol. The white precipitate is collected by vacuum filtration, washed with methanol, air dried and placed in a vacuum oven at ambient temperature. About 48 grams of the polycarbonate essentially completely terminated by sulfonic acid phenyl carbonate is recovered. The inherent viscosity of this acid form of polycarbonate in THF is 0.255 dL/g and its $T_g$ is 139° C. The number average degree of polymerization of the polymer is determined by proton NMR to be 29.8.

The sulfonic acid phenyl carbonate terminated polycarbonate (45.0 g) is dissolved in 400 mL of 65 weight percent $CH_2Cl_2$/35 weight percent trifluoroacetic acid (TFA) to give a deep yellow solution. A solution of 1.1 g (13.4 mmol) of anhydrous sodium acetate (Aldrich) in 15 mL of TFA is then added drop-wise to the polymer solution. The yellow color of the polymer solution dissipates and the viscosity increases with addition of the base. The reaction mixture is stirred for an additional 5 minutes and then precipitated into 2 L of isopropanol. The white precipitate is collected by vacuum filtration, washed with isopropanol, air dried and then placed in a vacuum oven at 50° C. to yield 43.6 g of the sodium salt 4-sulfophenyl carbonate terminated polycarbonate. The inherent viscosity of the sodium salt of 4-sulfophenyl carbonate terminated polycarbonate in THF is 0.388 dL/g and its $T_g$ is 164° C. The number average degree of polymerization of the sodium salt 4-sulfophenyl carbonate polycarbonate is 25 as determined by proton NMR. The melt complex viscosity of the sodium salt 4-sulfophenyl carbonate polycarbonate is determined by a parallel plate Rheometrics IIE viscometer using a 25 millimeter diameter parallel plate fixture and the results are reported in Table 2.

EXAMPLE 2

Preparation of a Polycarbonate Terminated by 4-Sulfobenzoate by a Solution Process Example 2A: Preparation of 4-Chlorosulfonylbenzoic Acid 4-Chlorosulfonylbenzoic acid is prepared by procedures described in (*J. Chem. Soc.*, Vol. 121, 2022–26, 1922). A 250 mL flask equipped with condenser, $CaCl_2$ drying tube and magnetic stirrer is charged with 35.1 g (0.146 mol) of potassium 4-sulfobenzoic acid and 50 mL of chlorosulfonic acid. The flask is placed in an oil bath and warmed to 100° C. After 1 hour at temperature, the reaction mixture is homogeneous. The reaction mixture is cooled and poured onto 300 g of crushed ice. The white precipitate is collected by filtration and washed 3 times with 100 mL portions of cold water. After air drying the solid is placed in a vacuum oven at 65° C. to yield 26.7 g of 4-chlorosulfonyl benzoic acid.

Example 2B: Preparation of a Polycarbonate Terminated by 4-Sulfobenzoate

A 12 L, 4-neck flask equipped with condenser, mechanical stirrer, thermometer and gas inlet tube is filled with 25.9 g (0.177 mol) of 4-chlorosulfonyl benzoic acid of Example 2A and 507 mL (6.27 mol) of pyridine. After stirring for 30 minutes under a nitrogen atmosphere, 5 L of methylene chloride and 536.5 g (2.35 mol) of bisphenol A is added. Gaseous phosgene is then added to the flask until an aliquot of the reaction mixture indicates a positive end point with 0.1 percent 4-(4-nitrobenzyl)pyridine in tetrahydrofuran. A total of 235.7 g (2.38 mol) phosgene is needed. Excess phosgene is consumed by addition of 5 mL of methanol.

The reaction mixture is stirred with 1 L of water for 60 minutes in order to destroy any sulfonyl chloride ends. Next, 250 mL of concentrated HCl is added and the reaction mixture stirred for 30 minutes to remove pyridine. The layers are separated and then the methylene chloride layer is washed with 0.6M HCl. If desired, the pyridinium salt of 4-sulfobenzoate terminated polycarbonate can be isolated at this stage by precipitation. The solubility, thermal and solution behavior of the pyridinium salt of 4-sulfobenzoate terminated polycarbonate is very similar to that of polycarbonate terminated by a neutral group such as a phenyl group. Proton NMR indicates that the polycarbonate is essentially completely terminated by the pyridinium salt of 4-sulfobenzoate. Also, by proton NMR the degree of polymerization of the pyridinium salt of 4-sulfobenzoate terminated polycarbonate is 40 and its inherent viscosity of 0.324 dL/g in methylene chloride at a concentration of 0.5 g/dL.

Tetrahydrofuran (600 mL) is added to the methylene chloride solution of the pyridinium salt of 4-sulfobenzoate terminated polycarbonate and the polymer solution is passed through an ion exchange column of strong acid cation exchange resin beads. This operation removes residual pyridine and converts the pyridinium salt to the free sulfonic acid. The acid of 4-sulfobenzoate terminated polycarbonate can be isolated at this stage. The solubility of the acid of 4-sulfobenzoate terminated polycarbonate is similar to that of the pyridinium salt of 4-sulfobenzoate terminated polycarbonate.

The sulfonic acid form of the 4-sulfobenzoate terminated polycarbonate is then converted to the sodium salt form by adding a solution of 10.1 g of sodium acetate in 100 mL of trifluoroacetic acid to the polymer solution. A significant increase in the solution viscosity is observed when this step is performed. The polymer solution (one volume) is then precipitated into 4 volumes of 10 percent (by volume) acetone in hexane in a Waring™ blender, collected by vacuum filtration, air dried and then dried in a vacuum oven at 120° C. to yield 557.1 g of the sodium salt of 4-sulfobenzoate terminated polycarbonate as a white, fibrous solid. Proton NMR indicates that essentially all of the termination groups are sodium salt of 4-sulfobenzoate and the degree of polymerization is 44.

GPC reveals an $M_n$ of 9216 and an $M_w$ of 21210 for the sodium salt of 4-sulfobenzoate terminated polycarbonate. Its inherent viscosity is 0.395 dL/g in methylene chloride/ trifluoroacetic acid (65/35, w/w) at a concentration of 0.5 g/dL and it has a glass transition temperature of 165° C. (20° C./min, inflection). The capillary melt viscosity of the sodium salt of 4-sulfobenzoate terminated polycarbonate is determined and the results reported in Table 1.

EXAMPLE 3

Preparation of Polycarbonate with 3-Sulfobenzoate Endcaps by a Solution Process

A 2 L, 4-neck flask equipped with condenser, mechanical stirrer, thermometer and gas inlet tube is charged with 5.18 g (23.5 mmol) of 3-chlorosulfonyl benzoic acid and 102 mL (1.26 mol) of pyridine. After stirring for 30 minutes under a nitrogen atmosphere, 1 L of methylene chloride and 107.3 g (0.47 mol) of bisphenol A is added. Gaseous phosgene is then added to the flask until an aliquot of the reaction mixture indicates a positive endpoint with 0.1 percent 4-(4-nitrobenzyl)pyridine in tetrahydrofuran. A total of 47.3 g (0.48 mol) phosgene is needed. Excess phosgene is consumed by addition of 1 mL of methanol.

The reaction mixture is stirred with 200 mL of water for 60 minutes in order to destroy any sulfonyl chloride ends that may have formed. Next, 70 mL of concentrated HCl is added and the reaction mixture stirred for 30 minutes to remove pyridine. The layers are separated and then the methylene chloride layer is washed with 250 mL of 0.5M HCl. If desired, the pyridinium salt of 3-sulfobenzoate terminated polycarbonate can be isolated at this stage by precipitation.

Tetrahydrofuran (100 mL) is added to the methylene chloride solution of the pyridinium salt of 3-sulfobenzoate terminated polycarbonate and the solution is passed through an ion exchange column of strong acid cation exchange resin beads. The sulfonic acid form of 3-sulfobenzoate terminated polycarbonate can be isolated at this stage.

The sulfonic acid form of 3-sulfobenzoate terminated polycarbonate is then converted to the sodium salt form by adding a solution of 2.02 g of sodium acetate in 15 mL of trifluoroacetic acid to the polymer solution. A significant increase in the solution viscosity is observed when this step is performed. The polymer solution (one volume) is then precipitated into 4 volumes of 10 percent (by volume) acetone in hexane in a Waring™ blender, collected by vacuum filtration, air dried and then dried in a vacuum oven at 120° C. to yield 93.2 g of the sodium salt of 3-sulfobenzoate terminated polycarbonate as a white, fibrous solid. Proton NMR indicates that approximately 80 percent of the 3-chlorsulfonyl benzoic acid ended up on the polymer chain as sodium salt of 3-sulfobenzoate termination groups as desired and 20 percent are incorporated into the polymer chain. Even so the polycarbonate is essentially completely terminated by said 3-sulfobenzoate groups. The groups incorporated in the polymer chain are bonded through the sulfonate group such that the sulfonate group is not ionic but is an integral part of the chain (i.e., the sulfur containing group is not pendant from the chain).

EXAMPLE 4

Preparation of a 3-Sulfobenzoate Terminated Polycarbonate by a Melt Process (Transesterification)

Example 4A: Preparation of Phenyl 3-Sulfobenzoate Sodium Salt

A 1L, 3-neck flask equipped with thermometer, mechanical stirrer and distillation head is filled with 133.3 g (0.67 mol) of sodium 3-sulfobenzoic acid, 288.0 g (1.34 mol) of diphenyl carbonate and 1.5 g (14 mmol) of sodium carbonate. The flask is placed under a nitrogen atmosphere and the flask heated with a heating mantle. Once the diphenyl carbonate is melted the mechanical stirrer is started. When the temperature of the melt reaches 300° C. phenol begins to distill. The reaction mixture becomes pasty off-white and then yellow and eventually black. After about 30 minutes phenol distillation stops and the heat is removed. The black melt solidifies to a yellow solid. After cooling the solid is removed from the flask and dissolved in approximately 400 mL of water. The aqueous solution is washed twice in 300 mL of methylene chloride and then the water is removed by rotary evaporation to yield the crude product. The solid is suspended in wet ethanol (1–2 percent water) and warmed on a steam bath to form a solution. The solution is hot filtered and then heated on the steam bath to evaporate solvent until crystallization begins. The solution is cooled to room temperature and then put in a refrigerator at about 5° C. The product is collected by filtration and dried in a vacuum oven at 90° C. The resulting sodium phenyl 3-sulfobenzoate is ground with a mortar and pestle yielding 163.6 g. The melting temperature $(T_m)$ is 287° C., Example 4B: Preparation of a 3-Sulfobenzoate Terminated Polycarbonate A 3 L stainless steel reactor is filled with diphenyl carbonate (1108 g, 5,174 moles) bisphenol A (1125 g, 4.928 moles) and sodium phenyl 3-sulfobenzoate of Example 3A (45.04 g, 0.1500 mole). The reactor is evacuated and purged with nitrogen 3 times and then the reaction mixture is heated to 220° C. under a nitrogen atmosphere. Aqueous LiOH (1 mL of 0.132M) is injected into the stirred reaction solution resulting in immediate vigorous boiling. The reaction pressure is reduced at 30 mm Hg/min down to 30 mm Hg and then at 5 mm Hg/min until a final pressure of less than 0.5 mm Hg is reached. At this point the reaction melt is viscous. The reaction temperature is increased to 280° C. and maintained at that temperature for 5 minutes at full vacuum (0.5 mm Hg). The reactor is then pressurized to 900 mm Hg with nitrogen and the clear, yellow, viscous melt is forced through a ½ inch port at the bottom of the reactor. A total of 850 g of polymer is recovered. The recovered polymer has two distinct components as indicated by two glass transition temperatures (148° and 217° C.) of approximately equal energies (−0.05 W/g) as determined by DSC. One component is a polycarbonate having ester bonded ASTer groups and the other component is a polycarbonate not terminated by ester bonded ASTer groups as determined by NMR.

If so desired, the two above components can be separated by, for example, the following procedure. A portion of the above recovered polycarbonate is dissolved in 250 mL of a mixed solvent 65 weight percent $CH_2Cl_2$/35 weight percent $CF_3CO_2H$ and then added to 1.5 L of methanol and subsequently blended in a blender. The polycarbonate not terminated by ASTer groups precipitates and is removed by filtration. The ASTer group terminated polycarbonate is recovered by evaporating the filtrate solvent.

Comparative Example 1

Comparative Example 1 is a commercially available linear aromatic polycarbonate which is a product of bisphenol A and a carbonate precursor as described herein. This particular polycarbonate has a melt flow of 22 as determined by ASTM D 1238.

Comparative Example 2

Comparative Example 1 is a commercially available branched aromatic polycarbonate which is a product of bisphenol A and a carbonate precursor as described herein. This particular polycarbonate has a melt flow of 3 as determined by ASTM D 1238.

Comparative Example 3

Preparation of a Phenol Terminated Polycarbonate

A polycarbonate having terminating groups containing a phenol group as described herein is prepared by condensation of bisphenol A with phosgene in methylene chloride with pyridine as a base as described by U.S. Pat. No. 3,028,365. The inherent viscosity of the polymer in methylene chloride is 0.290 dL/g and in tetrahydrofuran (THF) it is 0.313 dL/g (25.0° C., 0.5 g/dL). The $T_g$ of the polymer is 144° C. The number average degree of polymerization is 28.7 as determined by proton NMR.

Comparative Example 4

Preparation of a Phenyl Terminated Polycarbonate

A phenyl terminated polycarbonate is prepared from the above Comparative Example 3 phenol terminated polycarbonate. A 1 L, 4 neck flask equipped with condenser, stirrer and nitrogen inlet is filled with 40 g (5.2 mmol) of the phenol terminated bisphenol A polycarbonate of Comparative Example 3 and 400 mL of methylene chloride. The reaction vessel is stirred until all of the polymer dissolves and then the flask is cooled in an ice bath. Phenyl chloroformate (7.5 g, 47.9 mmol) is added to the reaction mixture in one portion followed by addition of 5.25 g (51.9 mmol) of triethylamine. The reaction mixture is stirred in the ice bath for 2 hours and then the ice bath is removed. The reaction mixture is further stirred at ambient temperature for 24 hours. The reaction mixture is then washed with 100 mL of 3N HCl followed by 100 mL of 1N HCl. The polymer solution is then passed through a column of strong acid cation exchange resin beads, concentrated to 300 mL and precipitated into 1.5 L of methanol. The white precipitate is collected by vacuum filtration, washed with methanol, air dried and then placed in a vacuum oven at 50° C. to yield 38.1 g of polymer. Proton NMR of the material indicates that Comparative Example 4 polycarbonate is a fully phenyl capped bisphenol A polycarbonate. The polycarbonate has an inherent viscosity of 0,312 dL/g in THF and a $T_g$ of 143° C.

Comparative Example 5

Attempt to Prepare Polycarbonate Capped with Sulfonated Phenyl by an Interfacial Process as Described by U.S. Pat. No. 4,469,860

A 250 mL flask equipped with dry ice condenser, gas inlet tube, stirrer and pH electrode is charged with 3.03 g (13.3 mmol) of bisphenol A, 0.93 g (4.4 mmol) of the sodium salt of 5-hydroxy-2-methylbenzenesulfonic acid, 100 mg of triethylamine and 50 mL of water. The pH of the aqueous phase is raised to 11 by the addition of 5N NaOH to facilitate dissolution of bisphenol A. Methylene chloride (50 mL) is added and the reaction mixture is cooled in an ice bath. Phosgene is added to the reaction mixture. Aqueous 5N NaOH is added as needed to keep the pH of the aqueous phase from falling below 9. Stirring is stopped and the reaction mixture is allowed to stand. The layers only partially separated. HPLC analysis of the organic layer shows it contains phenol terminated oligomers of bis-A polycarbonate and analysis of the aqueous layer shows it contains mainly 5-hydroxy-2-methylbenzenesulfonic acid. NMR results indicate that polycarbonate terminated by sulfonated terminating groups is not formed in this process.

Comparative Example 5 demonstrates the difficulty in terminating a polycarbonate by an aqueous interfacial polymerization process which supports the results of Degee, previously described.

TABLE 1

Capillary Melt Rheology of Example And Comparative Example Polycarbonate

| Sample | Analysis Temp. | Viscosity (Poise × 1000) at a Given Shear Rate | | | | | Ratio of Visc. at 53.6 1/s to 5360 1/s |
|---|---|---|---|---|---|---|---|
| | | 53.6 1/s | 160.8 1/s | 536 1/s | 1608 1/s | 5360 1/s | |
| Ex.2 | 333° C. | 44.0 | 22.2 | 11.9 | 6.16 | 2.80 | 15.7 |
| Comp. Ex.1 | 300° C. | 2.44 | 2.43 | 2.32 | 1.99 | 1.20 | 2.0 |
| Comp. Ex.2 | 300° C. | 27.2 | 15.4 | 9.16 | 3.45 | 2.30 | 11.8 |
| Comp. Ex.2 | 333° C. | 10.7 | 6.34 | 4.38 | 2.80 | 1.44 | 7.4 |

Table 1 shows the capillary melt rheology of a sodium salt of 4-sulfobenzoate terminated polycarbonate (Example 2) and commercially available polycarbonates terminated by tert butylphenol (Comparative 1 and 2). The rheological data shows that the sodium 4-sulfobenzoate terminated linear polycarbonate has a greater non-newtonian rheology than the linear aromatic commercial polycarbonates (Comparative Example 1). The non-newtonian rheology is even more pronounced than a branched polycarbonate (Comparative Example 2). The degree of non-newtonian behavior can be described by the ratio of the viscosity at low shear (i.e., 53.6 reciprocal seconds) over the viscosity at high shear (i.e., 5360 reciprocal seconds).

TABLE 2

Complex Viscosity of Example And Comparative Example Polycarbonate

| Sample | Viscosity (Poise × 10,000) at a Given Shear Rate | | | | | Ratio of Viscosity at 0.1 rad/s to 2000 rads/s |
|---|---|---|---|---|---|---|
| | 2000 rads/s | 100 rads/s | 10 rads/s | 1 rad/s | 0.1 rad/s | |
| Ex.1 | 1.3 | 20 | 147 | 600 | 1130 | 870 |
| Comp. Ex.3 | 0.5 | 4.5 | 11 | 15 | 16 | 3.2 |
| Comp. Ex.4 | 0.7 | 4.3 | 9.7 | 12 | 13 | 18.6 |

Viscosity determined at a temperature about 50° C. higher than the Tg of each polymer.

Table 2 shows the melt complex viscosity of a sodium salt of 4-sulfophenyl carbonate terminated polycarbonate (Example 1) compared to a phenol and phenyl terminated polycarbonate (Comparative 3 and 4). Because Example 1 and Comparative Example 4 are made by exchanging the terminal groups of Comparative Example 3, the only difference in the samples of Table 2 is the polymer chain terminal groups. The data in Table 2 show that the polycarbonate of this invention, which is terminated by an ASTer group, has significantly greater non-newtonian rheology compared to a similar polycarbonate terminated by a neutral phenol or phenyl group.

What is claimed is:

1. A polycarbonate comprising a thermoplastic aromatic polycarbonate which has a plurality of terminating groups wherein at least about 10 mole percent of said terminating groups are an aromatic sulfonated terminating (ASTer) group having the structure:

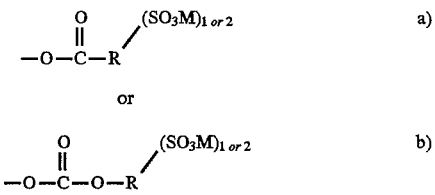

wherein R is an aromatic group, and M is selected from the group consisting of hydrogen, a quaternary nitrogen group, a quaternary phosphorous group, an alkali metal, zinc, tin, aluminum and an alkaline earth metal, the thermoplastic aromatic polycarbonate having reduced solubility in a chlorinated solvent compared to an aromatic polycarbonate of similar molecular weight without said aromatic sulfonated terminating groups.

2. The thermoplastic aromatic polycarbonate of claim 1 wherein at least 20 mole percent of the terminating groups are an ASTer group.

3. The thermoplastic aromatic polycarbonate of claim 2 wherein at least 50 mole percent of the terminating groups are an ASTer group.

4. The thermoplastic aromatic polycarbonate of claim 1 wherein R is phenylene.

5. The thermoplastic aromatic polycarbonate of claim 1 wherein M is selected from the group consisting of alkali metal, alkaline earth metal, zinc, tin and aluminum.

6. The thermoplastic aromatic polycarbonate of claim 5 wherein M is sodium.

7. The thermoplastic aromatic polycarbonate of claim 1 wherein the thermoplastic aromatic polycarbonate is essentially immiscible in methylene chloride after 24 hours at room temperature.

8. The process of claim 7 wherein the nonaqueous solvent is a chlorinated hydrocarbon.

9. The process of claim 8 wherein the nonaqueous solvent is methylene chloride.

10. The process of claim 7 wherein the aromatic dihydroxy compound is an aromatic diol and the carbonate precursor is phosgene.

11. The process of claim 10 wherein the aromatic diol is bisphenol A.

12. The process of claim 7 wherein the aromatic polycarbonate is an aromatic polycarbonate terminated by a phenol group.

13. The process of claim 7 further comprising reacting the aromatic polycarbonate terminated by an aromatic sulfonated terminating group to form an aromatic polycarbonate terminated by an aromatic sulfonated terminating group having a different cation M.

14. A process to make an aromatic polycarbonate having improved solvent resistance and non-Newtonian melt rheology, the process comprising
melting (A), a sulfonated aromatic terminating compound having the structure:

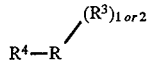

wherein R is an aromatic group,
R³ is —SO3M in which M is hydrogen, a quaternary nitrogen group, a quaternary phosphorous group, an alkali metal, zinc, tin, aluminum or an alkaline earth metal, and
R⁴ is
  (a) HO—,
  (b) R⁵O(O)C— in which R⁵ is hydrogen, an alkyl group or an aromatic group, or
  (c) R⁶O(O)CO— in which R⁶ is an alkyl group or an aromatic group,
with (B),
  (i) an aromatic polycarbonate,
  (ii) an aromatic dihydroxy compound and a carbonate precursor, or
  (iii) a combination thereof,
at a temperature above the melting temperature of the aromatic polycarbonate, aromatic dihydroxy compound or carbonate precursor for a time and subatmospheric pressure sufficient to react (A) with (B) to form an aromatic polycarbonate having a plurality of terminating groups wherein at least about 10 mole percent of the terminating groups of the aromatic polycarbonate are an aromatic sulfonated terminating (ASTer) group.

15. The process of claim 14 wherein the reaction is performed in the presence of a basic catalyst.

16. The process of claim 15 wherein the basic catalyst is lithium hydroxide.

17. The process of claim 14 wherein the carbonate precursor is diphenyl carbonate and the dihydroxy compound is bisphenol A.

18. The process of claim 14 wherein the aromatic polycarbonate is a polycarbonate which is a product of bisphenol A and a carbonate precursor.

19. The process of claim 14 wherein the sulfonated aromatic terminating compound is a phenyl ester of a sulfonated aromatic carboxylic acid or a sulfonated diphenylcarbonate.

20. A process to make an aromatic polycarbonate having improved flame resistance and non-Newtonian melt rheology, the process comprising
dissolving (A), a sulfonated aromatic terminating compound having a structure:

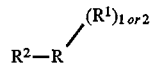

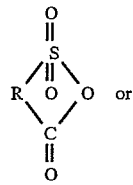

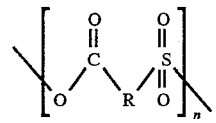

wherein

R is an aromatic group,

R¹ is —S(O)2J in which J is (a) a halogen or (b) —OM$_s$, where M$_s$ is hydrogen, a quaternary phosphorous group, or a quaternary nitrogen group, R2 is
  (1) HO— provided that J is —OM$_s$,
  (2) XC(O)O— in which X is a halogen and provided that J is —OM$_s$,
  (3) HO(O)C— provided that J is a halogen, or
  (4) X(O)C— in which X is a halogen, with (B),
  (i) an aromatic polycarbonate,
  (ii) an aromatic dihydroxy compound and a carbonate precursor, or
  (iii) a combination thereof, in a nonaqueous solvent in the substantial absence of water and in the presence of an organo amino base for a time and temperature sufficient to form an aromatic polycarbonate having a plurality of terminating groups wherein at least about 10 mole percent of the terminating groups of the aromatic polycarbonate are an aromatic sulfonated terminating (ASTer) group.

21. The process of claim 14 wherein the sulfonated aromatic terminating compound is soluble in (B).

* * * * *

UNITED STATES PATENT AND TRADEMARK OFFICE
CERTIFICATE OF CORRECTION

PATENT NO. : 5,644,017
DATED : Jul. 1, 1997
INVENTOR(S) : Ray E. Drumright; Michael J. Mullins; Stephen E. Bales It is certified that error appears in the above-identified patent and that said Letters Patent is hereby corrected as shown below:

Claim 8, column 18, line 53, "7" should correctly read -- 20 --

Claim 10, column 18, line 57, "7" should correctly read -- 20 --

Claim 12, column 18, line 62, "7" should correctly read -- 20 --

Claim 13, column 18, line 65, "7" should correctly read -- 20 --

Claim 14, column 19, line 13, "SO3M" should correctly read -- $SO_3M$ --

Signed and Sealed this

First Day of December, 1998

*Attest:*

BRUCE LEHMAN

*Attesting Officer*  Commissioner of Patents and Trademarks